(12) United States Patent
Weiss et al.

(10) Patent No.: US 6,409,136 B1
(45) Date of Patent: Jun. 25, 2002

(54) HOLDER FOR A BEVERAGE CONTAINER

(75) Inventors: Martin Weiss, Bonn (DE); I. Mehmet Ozozturk, Solihull (GB)

(73) Assignees: Fischerwerke Artur Fischer GmbH & Co. KG, Waldachtal (DE); Land Rover Group Limited, Warwickshire (GB)

( * ) Notice: Subject to any disclaimer, the term of this patent is extended or adjusted under 35 U.S.C. 154(b) by 0 days.

(21) Appl. No.: 09/625,716

(22) Filed: Jul. 26, 2000

(30) Foreign Application Priority Data

Jul. 27, 1999 (DE) .......................................... 199 35 144

(51) Int. Cl.[7] ................................................ B60R 7/04
(52) U.S. Cl. .................. 248/311.2; 224/926; 296/37.14
(58) Field of Search ........................... 248/311.2, 316.1, 248/299.1, 284.1; 296/24.1, 37.8, 37.14; 224/282, 926

(56) References Cited

U.S. PATENT DOCUMENTS 5,505,516 A    4/1996   Spykerman et al. ..... 248/311.2

FOREIGN PATENT DOCUMENTS

| DE | 42 00 823 A1 | 7/1993 |
| DE | 43 06 935 C1 | 7/1994 |
| DE | 93 06 415.2 | 10/1994 |
| JP | 08002308 A | 9/1996 |

*Primary Examiner*—Daniel P. Stodola
*Assistant Examiner*—Erica B. Harris
(74) *Attorney, Agent, or Firm*—Michael J. Striker

(57) ABSTRACT

A holder for a beverage container has two holding elements which are turnable around two turning axes spaced from one another from a substantially lying position to a substantially standing position and vice versa so that the holding elements in the substantially standing position have a distance therebetween which allows insertion of a beverage container between the holding elements, and a coupling transmission which provides an opposite turning movement of the holding elements.

10 Claims, 4 Drawing Sheets

HOLDER FOR A BEVERAGE CONTAINER

BACKGROUND OF THE INVENTION

The present invention relates to a holder for a beverage container which is provided for example for mounting in a central console of a motor vehicle.

Such holders are known in many modifications. Conventional holders are provided with a drawer-like extendable holding element which has an adjustment opening for insertion of a beverage container, such as for example a beverage box, a cup or a can. Holders are also known, in which a holder element is lifted from its lower position to its upper position by a mechanical structure. Different embodiments can be provided for such mechanical structures.

SUMMARY OF THE INVENTION

Accordingly, it is an object of the present invention to provide a holder for a beverage container of the above mentioned general type which is formed so that it is substantially shallow.

In keeping with these objects and with others which will become apparent hereinafter, one feature of present invention resides, briefly stated, in a holder for a beverage container with two holding elements which are turnable around two turning axes which are spaced from one another, from a substantially lying position to a substantially upwardly standing position and vice versa. The substantially lying position of the holding elements is the position of non-use of the holder.

In accordance with a preferable embodiment of the holding elements they are formed as covers, and the holding elements close an opening of the holder.

In the substantially standing position, the both holding elements are located at a distance from one another, which makes possible an insertion of a beverage container between the both holding elements.

The both holding elements support the beverage container located between them laterally at a height which prevents a tilting of the beverage container.

Furthermore, the inventive holder has a coupling transmission which converts a turning movement of one holding element into an opposite turning movement to the other holding element. The coupling transmission acts so that the both holding elements are turned synchronously to the substantially extending position or in an opposite direction to the substantially lying position.

The invention has the advantage that the holder is formed shallow and can be mounted flush in a central console of a motor vehicle. Furthermore, the mechanical construction is simple and nevertheless provides a reliable support of an inserted beverage container. In addition, the holder has a robust construction.

In accordance with one embodiment of the invention, the coupling transmission has a coupling rod which connects the both turnable holding elements with one another. The coupling rod engages through a turning linkage turnably with the both holding elements, and the coupling rod engages with the holding elements at a distance from the turning axes of the holding elements, to provide a lever arm on the holding elements for transmission of their turning movement. The coupling rod engages at opposite sides of the turning axes on the both holding elements, and thereby the opposite movement of the holding elements is provided in a simple manner. For transmission of the turning movement of the one holding element to the other, in this design however the turnable coupling rod is needed to be arranged on the holding elements, and therefore the holder requires premovable parts.

In accordance with another embodiment of the present invention, a toothed gear transmission is provided, which converts a turning movement of one holding element to an opposite turning movement of another holding element.

In accordance with another embodiment of the present invention, an opening spring element is provided, which for example engages a holding element and turns it to a neutral, substantially standing position. Through the coupling transmission the opening spring element turns also the other holding element to a neutral substantially standing position. The opening spring element can engage also on another location, for example a coupling rod or a toothed gear. In the neutral, substantially standing position the opening spring element is relaxed, whereby also the relation of the neutral position of the holding element can be selected. In this position a beverage container of a small diameter can be inserted between the both holding elements. For the insertion of a beverage container with a greater diameter, the both holding elements are pressed from one another against the force of the opening spring element over the neutral position.

This embodiment of the invention allows a simple adaptation of the inventive holder to the beverage containers of different diameters. A further advantage of this embodiment is that the holding elements, when they are pressed from one another by the inserted beverage container over the neutral position, press with a prestress against the beverage container and therefore hold the same with a clamping force in a reliable fashion. In the substantially lying position, the holding elements of this embodiment of the invention are held by a releasable locking device. Such locking devices, for example push-push mechanical elements or cardioid curve controls are known in the art.

In accordance with a further feature of the present invention, the invention provides for a possibility of an automatic adaptation of the holder to the beverage containers of different diameters, with the use of a spring-loaded pressing flap on at least one of the both holding elements. The pressing flap is mounted turnably on the holding element and is pressed by a spring element against a side of a beverage container inserted between the both holding elements. The beverage container is thereby clampingly held between the both holding elements. For preventing the interference of the pressing flap in non-use position of the inventive holder, in this embodiment of the invention a transmission is provided with turns the pressing flap during turning of the holding element to a substantially lying position in direction of the holding element. In this embodiment of the invention with the pressing flap can be formed on the inventive holder independently from the previously described embodiments in which the holding elements for adaptation to the beverage containers of different diameters are pressed from one another of a neutral position against the force of an opening element.

In accordance with a further embodiment of the present invention, a cam transmission is provided as a drive for the pressing flap. It has a control cam, on which the control element connected with the pressing flap slides during turning of the holding elements to the substantially lying position. The control element can be formed for example as a control pin laterally projecting from the pressing flap. Also, it is possible that the pressing flap slides itself on the control cam. The course of the control cam is selected relative to the turning axis of the holding element so that, the desired turning movement of the pressing flap in direction of the holding element is provided during turning of the holding element to the substantially lying position.

In accordance with a further embodiment of the present invention a housing is provided, on which the both holding elements are turnably mounted. The housing has an opening on its upper side, which is closed by the holding elements in the substantially lying position of the holding elements, which are formed in this embodiment as covers. In the substantially standing position of the holding element, a beverage container inserted between the both holding elements stands on a bottom or the like of the housing. The housing forms a collecting trough for liquid which can overflow from the beverage container, for example during driving.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
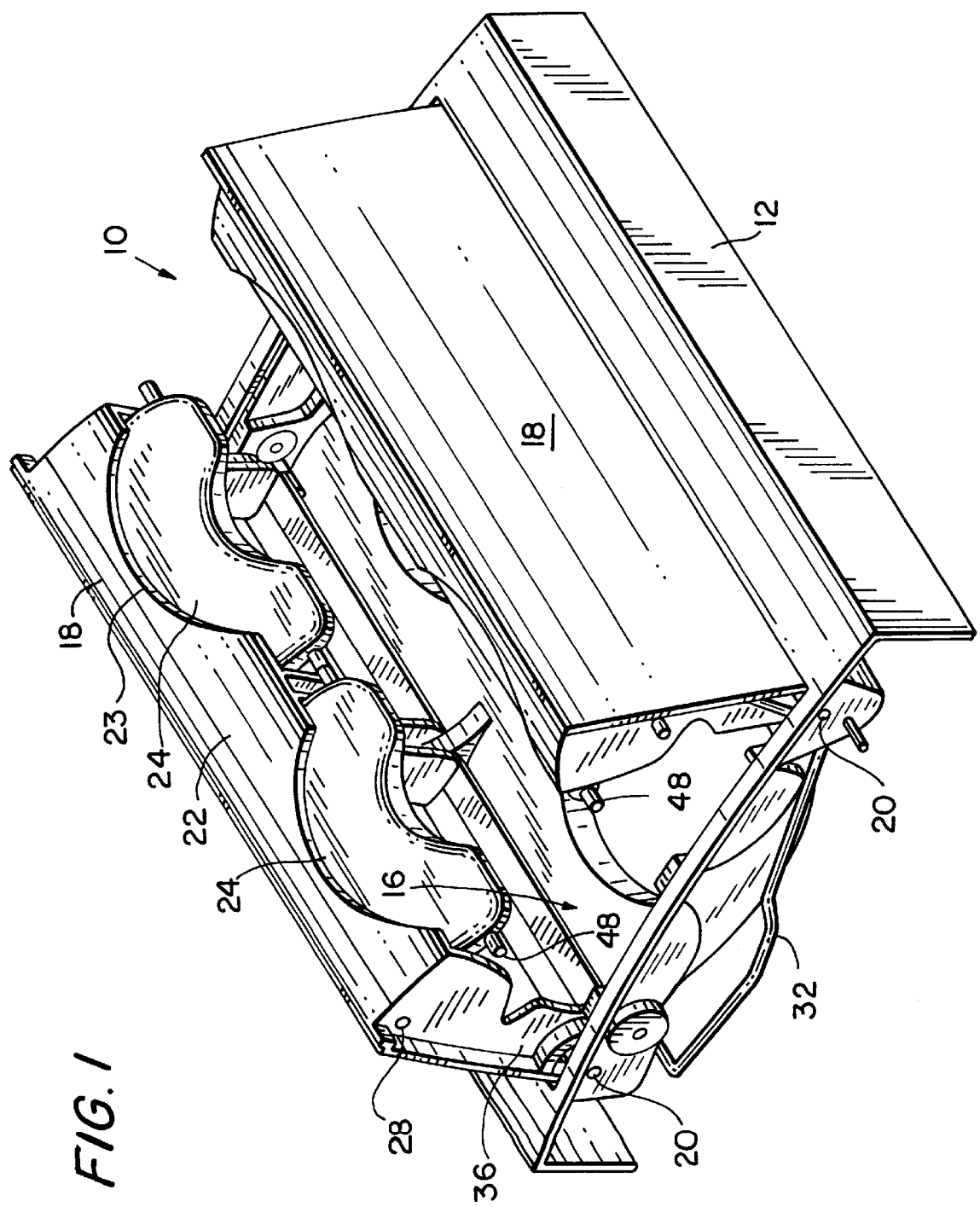
FIG. 1 a perspective view of an inventive holder in a use position.

A holder for a beverage container in accordance with the present invention as shown in FIG. 1 is identified as a whole with reference numeral 10. It has a box-shaped, flat housing 12 with a curved upper side. The housing 12 forms a collecting trough. On its upper side it has a rectangular opening 16 which is closed by two covers 18. The covers 18 are turnably connected with the housing 12 by laterally projecting turning pins 20 which engage in holes on both sides of the housing 12. The turning pins 20 define turning axes of the cover 18. The turning axes extends parallel to the longitudinal edges of the opening 16 and to the longitudinal edges of the cover 18, and each arranged for each cover 18 on a longitudinal edge of the opening 16 of the housing 12.

Figure 2:
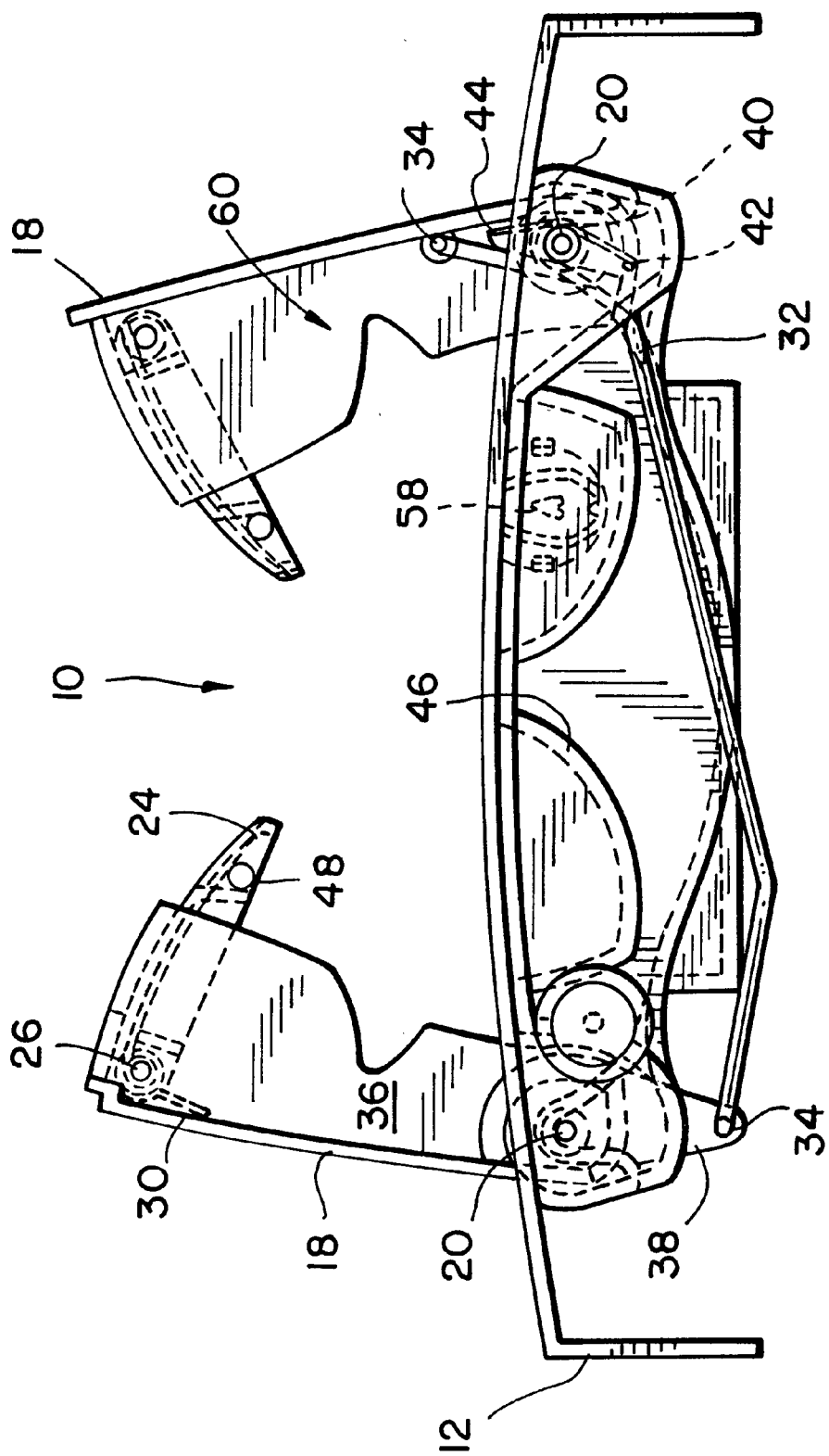
FIG. 2 is an end view of the inventive holder of FIG. 1.
Figure 3:
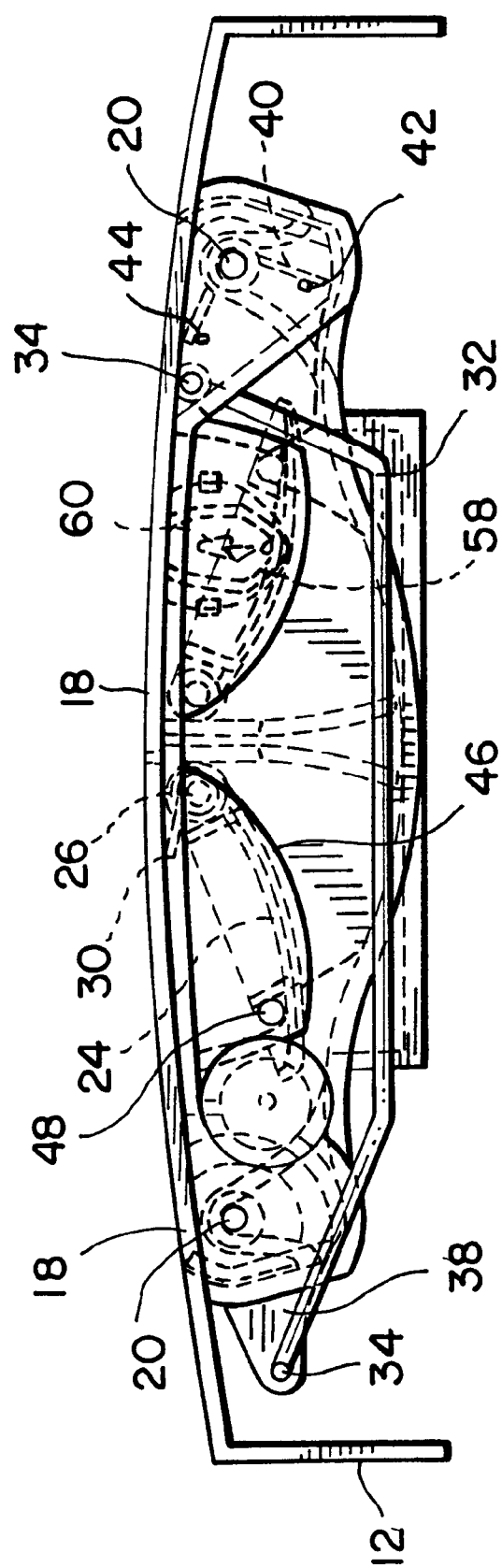
FIG. 3 is a showing the inventive holder of FIG. 2 in a non-use position.

The both covers 18 can be turned from a substantially lying position shown in FIG. 3 to a substantially standing position shown in FIGS. 1 and 2. In the substantially lying position the covers 18 close the opening 16 of the housing 12. In the substantially standing position both covers 18 are located at a distance from one another, which makes possible the insertion of a not shown beverage container, such as for example a beverage box, a cup or a can. The covers 18 form holding elements for two such beverage containers in the shown embodiment. In order to reliably hold the beverage containers inserted between the both covers 18, each cover 18 has a longitudinal wall 22 which in the use position projects in direction towards the corresponding other cover 18. The longitudinal walls 22 have correspondingly two circular arc-shaped recesses 23 which provide a hold on an inserted beverage container.

For adapting of the inventive holder 10 to the beverage containers of different diameters, each of the covers 18 is provided for each of the recesses 23 with a spring-loaded turnable pressing flap 24. The pressing flaps 24 have laterally projecting turning pins 26 which engage in pin holes 28 of the covers 18. A torsion helical spring 30 is arranged on one of the of the turning pins 26 and is supported on an inner or lower side of the cover 18, so as to press a compensating flap 24 against an inner or lower side of the longitudinal wall 22 of the cover 18. When the beverage container is inserted between the covers 18, the compensation flaps 24 are pressed against the force of the torsion helical spring 30 downwardly and in turn press from outside against the beverage containers and hold them thereby in the holder 10.

The covers 18 which form both holding elements have a coupling transmission which will be described in connection with FIG. 2. FIG. 2 shows an end side of the holder 10, wherein an end wall of the housing 12 which faces an observer is not shown, so as to make visible the coupling transmission. The coupling transmission has a coupling rod 32 which is suspended in ears 34 in the end walls 26 of the cover 18. The ears 34 form turning links 34 for the coupling rod 32. These turning links 34 are arranged at a distance from the turning pins 20, to provide turning of the cover 18. The turning links 34 of the coupling rod 32 are arranged at both covers 18 on opposite sides of the turning pins 20 of the cover 18. The coupling rod 32 engages in the substantially standing position of the cover 18 one of the covers 18 above and the other cover 18 below the turning pins 20. With this opposite arrangement of the turning links 34 of the coupling rod 32 with respect to the turning pins 20 of the cover 18, the coupling rod 32 provides an opposite turning movement of the both covers 18. The both covers 18 move positively synchronously relative to one another by the coupling rod 32 to the substantially lying position or vice versa to the substantially standing position.

In order to mount the coupling rod 32 in the substantially standing position of the cover 18 on the left cover 18 and in the shown embodiment under the turning pin 20, this cover is provided with a projection 38. The projection extends the cover 18 over the turning pin 20 and has an ear 34 which forms a turning link 34 for the coupling rod 32.

The holder 10 has an opening spring element formed as a torsion helical spring 40. One leg of the torsion helical spring 40 is mounted between two holding cams 42 of the housing 12. The other leg of the torsion helical spring 40 is located on an inner side of the cover 18 and held by a holding cam 44 in abutment against the cover 18. The torsion helical spring 40 turns the cover 18 from the substantially lying position shown in FIGS. 1 and 2, to a substantially standing position. In the position shown in FIGS. 1 and 2, the torsion helical spring 40 is relaxed, whereby this position of the cover 18 is also identified as a neutral position. Through the coupling rod 32, the torsion helical spring 40 turns also the other cover 18 to the shown, neutral substantially standing position. In this neutral, substantially standing positions the both covers 18 extend upwardly inclinedly relative to one another.

During insertion of a beverage container with a greater diameter, the both covers 18 are pressed from one another over the neutral position shown in FIGS. 1 and 2 against the force of the torsion helical spring 40 which is relaxed in the neutral position. The torsion helical spring 40 presses the both covers 18 together in direction to the neutral position and clamp the inserted beverage container. The turnability of the both covers 18 over the neutral position from one another serves for adaptation to the beverage containers of different diameters. This possibility of adaptation of the inventive holder 10 to the beverage containers of different diameters can be provided additionally or instead of the pressing flap 24, which also serves for adaptation of the inventive holder 10 to the different diameters of the beverage containers.

In the closed, substantially lying position, the both covers 18 are held against the force of the torsion helical spring 40 by a so-called push-push mechanical structure or cardiod-locking device 58–60. With a brief pressure on one of the covers 18, the locking device 58 is released and the cover 18 turn with spring actuation to the substantially standing position.

The holder 10 has a transmission for the pressing flaps 24, which turns the pressing flaps 24 during turning of the covers 18 to the substantially lying position in direction toward the inner sides of the cover. The transmission is formed as a cam transmission. It has a stationary control cam 36 which is mounted on the inner side of the end wall of the housing 12. The pressing flaps 24 have laterally projecting sliding pins 48 which cooperate with the control cams 46. When the covers 18 are turned downwardly to the substantially lying position, the control pins 48 of the pressing flaps 24 come to abutment against the control cams 46, on which they slide. The control pins 48 turn the pressing flaps 24 against the force of the torsion helical springs 30 in direction to the inner side of the covers 18. This turning of the pressing flaps 24 in direction of the inner side of the cover 18 during turning of the covers 18 to the substantially lying position makes possible a smaller structural height of the housing 12.

Figure 4:
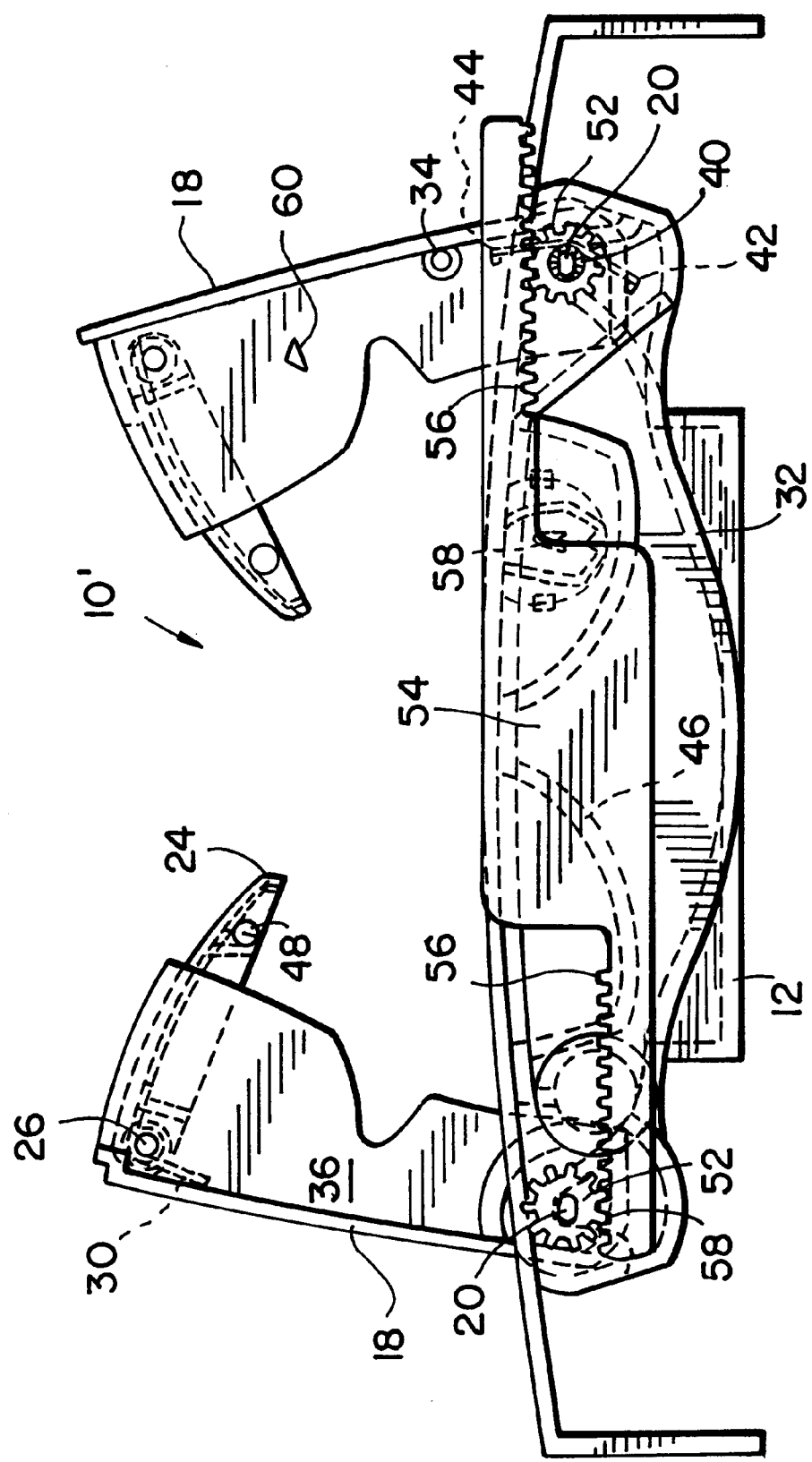
FIG. 4 is a view showing a different embodiment of the holder of FIG. 1, in the position shown in FIG. 2.

FIG. 4 shows a different construction of the holder 10. In the holder 10 shown in FIG. 4, the coupling transmission is formed as a toothed gear transmission. The covers 18 of the holder 10 of FIG. 4 have toothed gear segments 52 which extend concentrically in a circular arc around the turning pin 20 of the cover 18. The toothed gear segment 52 of one cover is located with a substantially standing cover 18 above, and the toothed gear segment 52 of the other cover 18 is located below the turning pin 20. A toothed rod 54 with two oppositely oriented, straight set of teeth 56 engages with the toothed gear segments 52 of the both covers 18.

The toothed rod 54 is guided displaceably in the housing 12. During turning of one cover 18, the tooth rod 24 is displaced and the other cover 18 is turned in the opposite direction. The toothed rod 54 activates similarly to the coupling rod 32, a synchronous turning of the covers 18 to the substantially lying position or to the substantially standing position. In other aspects the holder 10 shown in FIG. 4 is formed similarly to the holder 10 shown in FIGS. 1–3, and therefore additional elements of construction are not described to avoid repetition.

It will be understood that each of the elements described above, or two or more together, may also find a useful application in other types of constructions differing from the types described above.

While the invention has been illustrated and described as embodied in holder for a beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holder for a beverage container, comprising two holding elements that are turnable around two turning axes spaced from one another from a substantially lying position to a substantially standing position and vice versa so that said holding elements in said substantially standing position have a distance therebetween that allows insertion of a beverage container between said holding elements; a coupling transmission that provides an opposite turning movement of said holding elements; an opening spring element that turns said holding elements to a neutral substantially standing position, said holding elements being pressable from one another against a force of said opening spring element over said neutral position; and a releasable locking device that holds said holding elements against the force of said opening spring element in the substantially lying position.

2. A holder as defined in claim 1, wherein said holding elements are formed as covers, which in said substantially lying position, close an opening of the holder.

3. A holder as defined in claim 1, wherein said coupling transmission has a coupling rod that is connected through turning links turnably with said holding elements, said turning links being arranged at a distance from said turning axes of said holding elements on said holding elements, said turning links being arranged on said holding elements at opposite locations with respect to said turning axes so that said turning rod provides said opposite turning movement of said holding elements.

4. A holder as defined in claim 1, wherein said coupling transmission is formed as a toothed rod transmission.

5. A holder as defined in claim 1, further comprising a housing, said holding elements being formed as covers and turnably arranged on said housing, said housing being provided on an opening of said upper side that is closed by said holding elements in said substantially lying position, said housing being formed as a collecting trough for liquid which exits a beverage container inserted in the holder.

6. A holder for a beverage container, comprising two holding elements that are turnable around two turning axes spaced from one another from a substantially lying position to a substantially standing position and vice versa so that said holding elements in said substantially standing position have a distance therebetween that allows insertion of a beverage container between said holding elements; a coupling transmission that provides an opposite turning movement of said holding elements, one of said holding elements being formed as a turnable, spring-loaded pressing flap that presses an inserted beverage container in direction toward the other holding element; and a transmission for pressing said flap that during turning of said holding elements to said substantially lying position, turns said pressing flap in a direction of said holding element.

7. A holder as defined in claim 6, wherein said transmission for said pressing flap is formed as a cam transmission.

8. A holder as defined in claim 7, wherein said cam transmission has a stationary control cam, on which said pressing flap slides during turning of said holding element to said substantially lying position.

9. A holder as defined in claim 8, wherein said pressing flap directly slides on said stationary control cam.

10. A holder as defined in claim 8, wherein said pressing flap slides on said stationary control cam with a control element connected with said pressing flap.

* * * * *